UNITED STATES PATENT OFFICE.

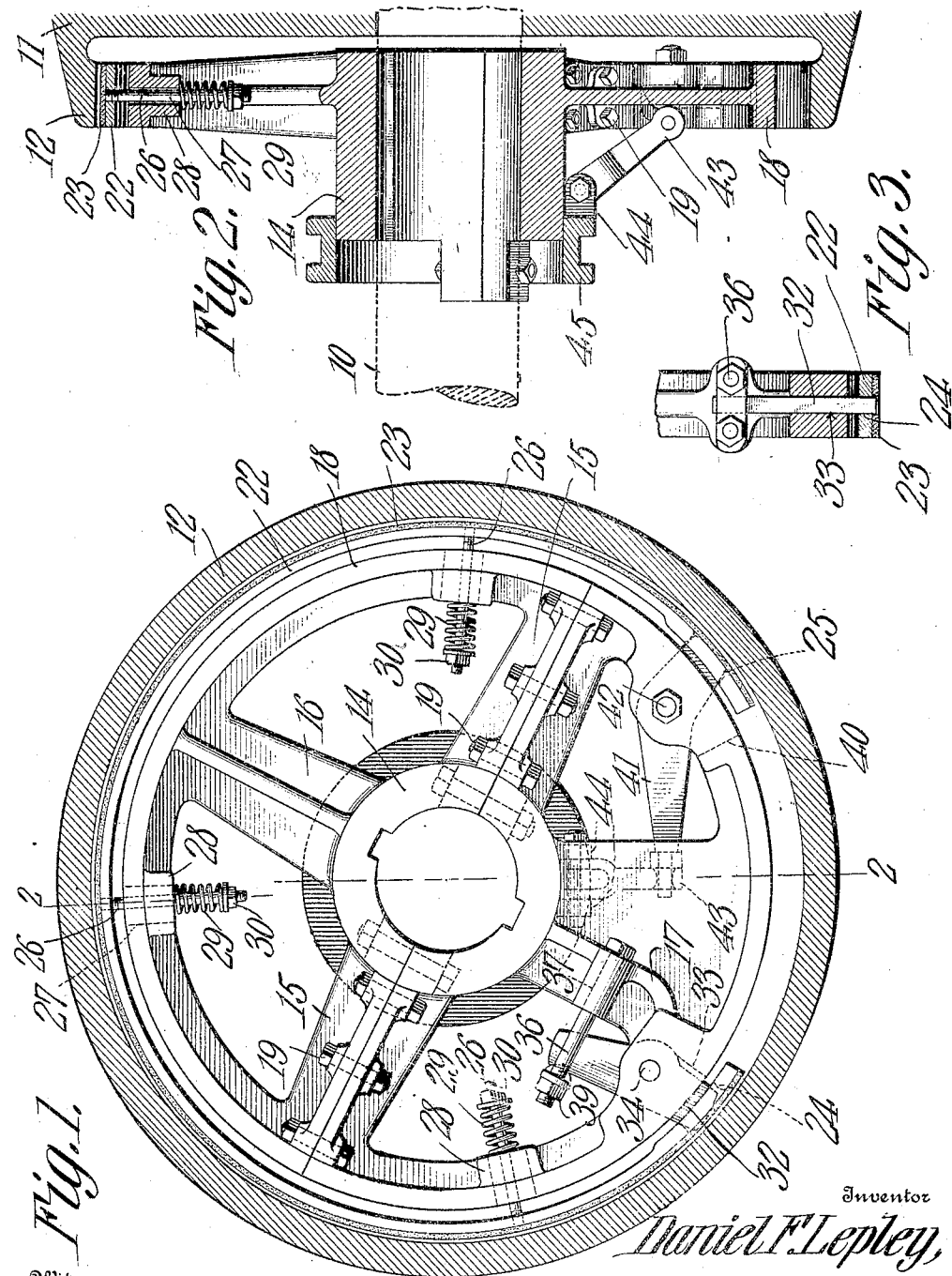

DANIEL F. LEPLEY, OF CONNELLSVILLE, PENNSYLVANIA.

FRICTION-CLUTCH.

No. 897,909.

Specification of Letters Patent.

Patented Sept. 8, 1908.

Application filed July 17, 1907. Serial No. 384,196.

*To all whom it may concern:*

Be it known that I, DANIEL F. LEPLEY, a citizen of the United States, residing at Connellsville, in the county of Fayette and State of Pennsylvania, have invented a new and useful Friction-Clutch, of which the following is a specification.

This invention relates to friction clutches, and has for its principal object to provide a clutch of very simple construction which may be readily applied and released without danger of breakage or distortion of the parts.

A further object of the invention is to provide a clutch which may be readily adjusted to compensate for wear.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is an elevation of a clutch constructed in accordance with the invention. Fig. 2 is a transverse sectional view of the same on the line 2—2 of Fig. 1. Fig. 3 is a section through the rim showing a detail of construction.

Similar numerals of reference are employed to indicate corresponding parts throughout the several figures of the drawings.

The clutch forming the subject of the present invention is designed to alternately connect and release the shaft 10 and a drum, pulley or other member 11 which is normally loose on the shaft, said member having a peripheral flange 12, within which the clutching member is arranged.

Rigidly secured to the shaft is a hub 14 from which project spokes 15, 16, and 17 carrying a rim 18, the hub, the spokes 15, and the rim being preferably divided, especially where the clutch is of very large diameter and the parts being secured together by bolts 19.

Extending around the rim is a curved steel band 22, to the outer face of which is secured a strip 23 of fiber or other suitable material, which will frictionally engage the inner surface of the flange 12. The clutch band is of less length than the periphery of the pulley, and its opposite ends are thickened and reinforced as shown in Fig. 1, one of such ends being provided with a seat 24, and the other with a similar seat 25.

Extending inward from the band are a number of spaced studs 26 that extend through elongated passages 27 formed in the periphery of the rim of the clutch, these passages extending also through bosses 28 that project inward from the inner surface of the rim. The passages 27 are of sufficient length to permit the necessary longitudinal movement of the band during the clutching and unclutching operations. The studs are of a diameter a trifle less than the width of the passages 27, so that the band is held from lateral displacement. The inner portion of each stud is surrounded by a coiled compression spring 29 that bears at one end against the boss 28 and at the opposite end against a nut 30 at the inner threaded end of the stud, these springs serving to retract the band and move the same to unclutching position. The clutching member as viewed in Fig. 1 is arranged to revolve clockwise, and that end of the band having the seat 24 is therefore the load supporting end of the clutch. Into the seat 24 extends the outer end of a lever 32, said lever passing through a slot 33 formed in a thickened portion of the rim 18, and an intermediate portion of the lever being mounted on a stud or pin 34. The lower central portion of the lever is rounded, being arranged on a curved line struck from the center of the stud 34, and this rounded surface fits against a corresponding concaved portion forming the lower wall of the slot 33, so that the clutching strain will be imposed on the rim 18 and spoke 17, rather than directly upon the pivot stud.

The inner end of the lever 32 is provided with a cap bored for the passage of adjusting screws 36 that extend also through openings 37 in the spoke 17. The headed end of the screws or bolts bear against one wall of the spoke, and the opposite or threaded ends thereof carry nuts 39 which may be adjusted to exercise greater or less pressure on the inner end of the lever 32 for the purpose of adjusting the friction band and compensating for any wear on the outer surface of the band or the inner surface of the flange 12. The rim 18 is further provided with a slot 40 through which passes a lever 41 that is pivoted on a pin 42. The outer end of the lever fits in the seat 25 of the friction band, while the inner end passes through an eye formed in the outer end of a link 43. The inner end of the link 43 is pivoted between lugs 44 projecting from a grooved collar 45 that is slidably mounted on the hub 15, and may be moved in the usual manner in a direction lengthwise of the shaft.

In applying the clutch the collar 45 is moved in the direction of the spokes, and the link 43 is thrust outward. This movement is transmitted through the lever 41 and thence to the friction band tending to move the latter in the direction of its length. As the opposite end of the band is supported by the link 32 and endwise movement is prevented, the band is compelled to spread outward into engagement with the inner surface of the flange 12 and the friction between the band and the flange will gradually increase until the full length of the band is in active clutching engagement, while the load is borne by the lever 32. In releasing, the collar 45 is moved in the opposite direction or away from the spokes, and the springs may retract the band.

In clutches of the band type, it is generally found impracticable to adjust to compensate for wear, but in the present instance any wear may be readily taken up by adjusting the bolts 36. This results in movement of the band in the direction of its length, that is to say, the same direction in which the clutching strain has been previously borne, so that there is no fresh strain or strain in another direction imposed on the band as a result of the adjustment.

I claim:—

1. In an internal friction clutch, a revoluble disk or wheel having slots in its rim, one wall of one of the slots being concaved, a friction band encircling the rim, a lever pivotally mounted in one of the slots and having a curved seating face resting against the concaved wall of the slot, means for adjusting said lever to compensate for wear of the parts, a second lever extending through a second slot in the rim and engaging the opposite end of the band, and means for operating the second lever to apply or release the clutch.

2. In an internal friction clutch, a revoluble disk or wheel the rim of which is provided with elongated passages, a friction band partly encircling the rim, an adjustable support for one end of the band, an operating lever connected to the opposite end of the band, and a series of studs secured to the band and projecting through the passages in the rim to prevent lateral displacement of said band.

3. In an internal friction clutch, a revoluble disk or wheel having a slotted rim and provided with elongated passages, a friction band partly encircling the same, an adjustable support extending through one of the slots and carrying one end of the band, a clutch operating lever extending through another slot and engaging the opposite end of the band, a series of studs projecting inward from the band and extending through the said passages in the rim, and springs encircling said studs and tending to contract the band and release the clutch.

4. In an internal friction clutch, a revoluble wheel or disk having a slotted rim, one of said slots having a concaved wall, a lever extending through said slot and having a convex face resting against the concaved wall, a friction band partly encircling the rim and having at one end an opening for the reception of one end of said lever, adjustable screws connected to the opposite end of the lever, a second lever extending through another slot in the rim and engaging the opposite end of the band, and means for operating said second lever.

In testimony that I claim the foregoing as my own, I have hereto affixed my signature in the presence of two witnesses.

DANIEL F. LEPLEY.

Witnesses:
P. BUFANO,
R. DE ANGELI.